United States Patent [19]

Bonsack

[11] 3,919,400
[45] Nov. 11, 1975

[54] RECOVERING CHLORINE FROM FERRIC CHLORIDE VAPORS

[75] Inventor: James Paul Bonsack, Aberdeen, Md.

[73] Assignee: SCM Corporation, New York, N.Y.

[22] Filed: Apr. 8, 1974

[21] Appl. No.: 458,510

[52] U.S. Cl. ............... 423/502; 423/149; 423/633
[51] Int. Cl.² .................................... C01B 7/00
[58] Field of Search ............... 423/149, 633, 502

[56] References Cited
UNITED STATES PATENTS

| 2,733,983 | 2/1956 | Daubenspeck | 423/149 |
| 2,940,827 | 6/1960 | Groves | 423/149 |
| 3,066,010 | 11/1962 | Horning et al. | 423/149 |
| 3,376,112 | 4/1968 | Dunn et al. | 423/633 |
| 3,793,444 | 2/1974 | Reeves et al. | 423/633 |

FOREIGN PATENTS OR APPLICATIONS

| 12,852 | 7/1970 | Japan | 423/633 |

OTHER PUBLICATIONS

Perkins et al., U.S. Bureau of Mines, R. I., No. 5428, 1958.

Henderson, et al., "Dechlorination of Ferric Chloride with Oxygen" *Metallurgical Transactions*, Vol. 3, Oct. 1972, pp. 2579–2583.

*Primary Examiner*—Oscar R. Vertiz
*Assistant Examiner*—Brian E. Hearn
*Attorney, Agent, or Firm*—Jerry K. Mueller, Jr.

[57] ABSTRACT

Feed containing ferric chloride is reacted with molecular oxygen to yield solid iron oxide byproduct and crude chlorine gas product containing unreacted ferric chloride vapor. Said crude gas is contacted with sodium chloride for generating liquid sodium ferric chloride salt complex and providing a first recovered chlorine gas product; and said complex is further reacted with molecular oxygen for providing a second recovered chlorine gas product. Selective chlorination of ilmenite is a prime source of said feed.

7 Claims, 1 Drawing Figure

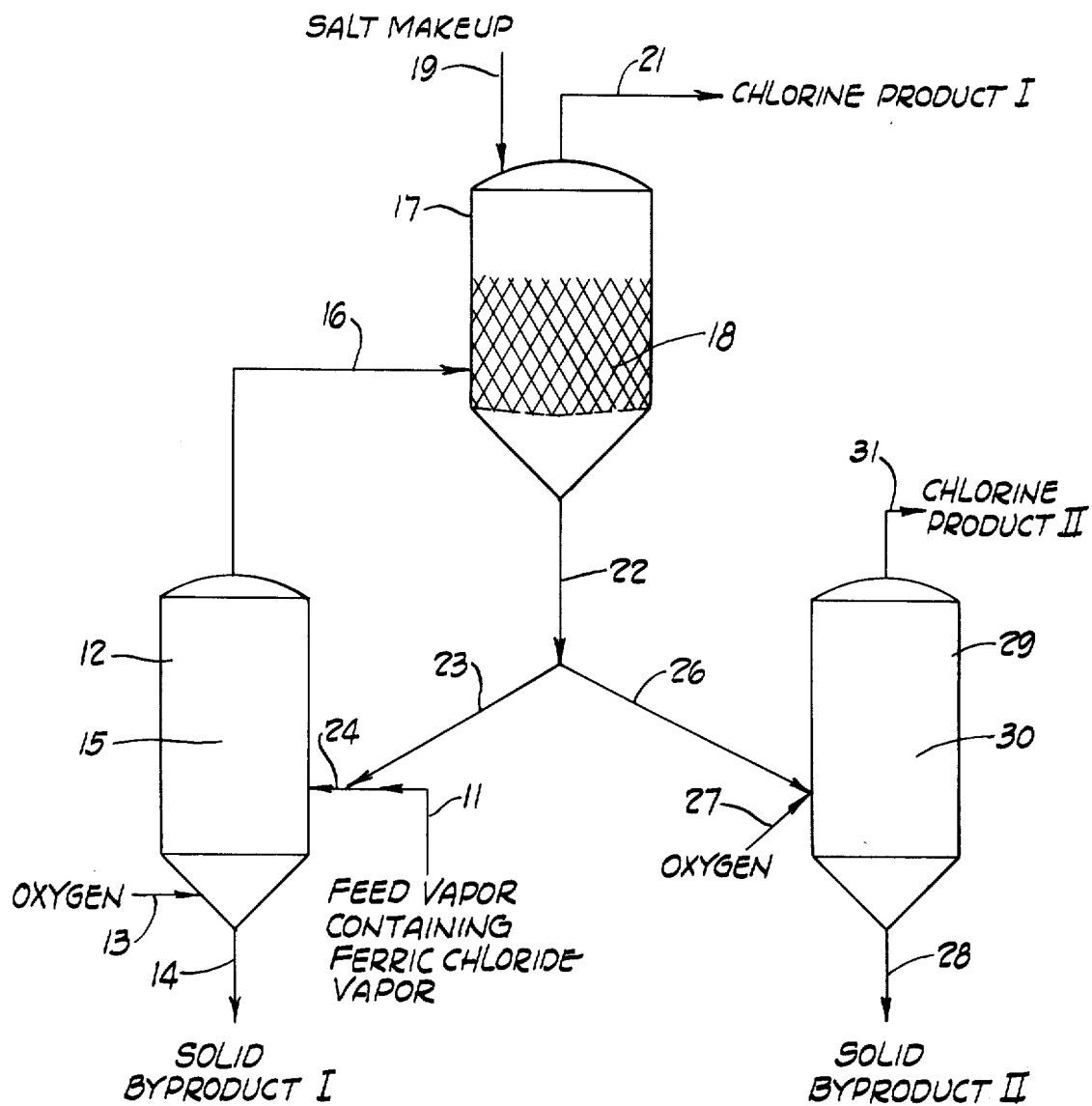

RECOVERING CHLORINE FROM FERRIC CHLORIDE VAPORS

This application is cross-referenced to the following applications filed on even date herewith: James Paul Bonsack U.S. Ser. Nos. 458,579 and 478,509 entitled "Recovering Chlorine from the Chlorination of Titaniferous Material" and "Ferric Chloride Oxidation Reactor", respectively; George R. Walker U.S. Ser. No. 459,034 entitled "Selective Chlorination of Ilmenite and the Like with Chlorine Recovery"; and the Bonsack and Walker U.S. Ser. No. 458,791 entitled "Oxidation of Ferric Chloride from Selective Chlorination." The disclosures of said listed applications are expressly incorporated in this one by reference.

This invention relates to an improvement in process for recovery of chlorine gas from ferric chloride, and more particularly to such improvement wherein sodium chloride complexing is used as an adjunct recovery step for obtaining such chlorine.

The process of ferric chloride oxidation in which the following reaction is involved is well-known:

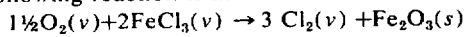

At temperature of 600° the equilibrium is reasonably favorable towards making the products chlorine gas and solid ferric oxide, but the reaction rate is extremely slow. At temperatures of 800°–900° the rate improves markedly, but the reaction to make such products is significantly incomplete. The rate of this reaction has been shown by the U.S. Bureau of Mines (Metallurigical Transactions 3,2579 (1972)) to be accelerated somewhat with the addition of solid sodium chloride. Very likely such sodium chloride converts in part during the reaction into a molten salt complex which itself is catalytic for the reaction.

Heretofore it also has been proposed to convert ferric chlorode to such molten salt "complex," then to oxidize such complex with molecular oxygen quite efficiently, thereby generating recoverable chlorine gas and byproduct solid iron oxide and sodium chloride (U.S. Pat. No. 3,376,112). A preferred method for making such liquid salt complex for the instant decomposing into chlorine, iron oxide, and salt is shown in the U.S. Bureau of Mines Report of Investigations 5428. U.S. Pat. No. 3,729,543 and the article by Cook et al., J. Phys. Chem. 65, September, 1961, pages 1505–1511 show properties of the complex.

The instant process is an improvement for recovering chlorine gas efficiently from ferric chloride. Basically it combines the use of the ferric chloride oxidation process as a primary step with the oxidation of such salt complex as a subsequent step. The teachings of the U.S. patents and publications cited in this specification are expressly incorporated herein by reference.

Broadly this process for recovering chlorine from feed bearing ferric chloride by oxidation thereof with molecular oxygen in a ferric chloride oxidation zone, under ferric chloride oxidizing conditions, wherefrom iron oxide is withdrawn as a solid byproduct while chlorine gas and unreacted ferric chloride vapor is withdrawn as a crude vapor stream, involves the improvement which comprises:

contacting said crude vapor stream with sodium chloride in a complexing zone under conditions for converting unreacted ferric chloride vapor therein into liquid sodium ferric chloride salt complex;

withdrawing from said complexing zone a vapor stream containing chlorine gas as a first recovery product;

withdrawing said liquid salt complex from said complexing zone;

contacting withdrawn salt complex with additional oxygen in a salt complex oxidizing zone under conditions for converting said salt complex into additional chlorine gas, additional solid iron oxide and sodium chloride byproducts;

withdrawing said byproducts from said salt complex oxidizing zone; and withdrawing said additional chlorine gas from said salt complex oxidizing zone as a second recovery product.

Further features of this improvement include use of a catalytic proportion of sodium ferric chloride salt complex-providing material in the ferric chloride oxidation zone, substantially completely arresting further oxidation of ferric chloride in the crude vapor stream being withdrawn from the top of ferric chloride oxidation zone 15 through outlet 16, and in salt complex oxidizing zone 18 as by cooling and/or chlorine injection, and the use of a ferric chloride-bearing feed vapor obtained by the selective chlorination of titaniferous material such as ilmenite ore, brookite ore, titaniferous slag, and mixtures of same with each other, with or without the addition of rutile ore. Such selective chlorination connotes the removal of iron from the ore or slag by chlorination with chlorine gas to the substantial exclusion of titanium values which remain in the ore or slag. This is to be contrasted with total chlorination where virtually all of the metal values are converted into volatile chlorides with chlorine gas.

The drawing is a flow diagram depicting the process flows for operating this improvement in various ways; it will be described more fully hereinafter in reference to a group of design cases.

In each design case the following should be understood: ferric chloride oxidation zone 15 (the primary reactor) operates under ferric chloride oxidizing conditions whereby solid iron oxide byproduct and chlorine gas are formed; complexing zone 18 operates under conditions for converting unreacted ferric chloride vapor in the crude vapor stream (emanating from zone 15) for yielding liquid sodium ferric chloride salt complex; and salt complex oxidizing zone 30 operates under conditions for generating additional chlorine gas, and additional solid iron oxide and sodium chloride byproducts. It should be further understood that in all of these design cases the pressure used in each zone will be substantially atmospheric and only high enough in each zone and line to cause the necessary flow of materials indicated, although it should be recognized that subatmospheric and superatmospheric pressures can be used in the several zones (designed, of course, to obtain the flow indicated using pumps, blowers and other conventional apparatus not shown). These zones are housed in conventional equipment composed of or lined with corrosion resistant metals, alloys, or refractory material (silica, fireclay, porcelain, etc.) adapted to render the reaction vessels housing such zones substantially inert towards the reaction ensuing and reaction products thereof under the conditions of operation. The piping, duct work, and product removal apparatus will be of similar material conventionally constructed.

U.S. Pat. Nos. 1,992,685; 3,793,444; 3,050,365; 3,092,456; 3,657,976; 3,325,252; and 3,793,444, are pertinent to the oxidation of ferric chloride with molecular oxygen in a ferric chloride oxidation zone, such zone being a single zone or a plurality of interconnected zones wherein these reactants react to yield chlorine gas and solid oxide byproduct. For efficiency and economy a single such oxidation zone is preferred, and the ferric chloride in the feed to such oxidation zone is in vapor form. The preferred source of oxygen for suppressing dilution of recovered chlorine most economically in such ferric chloride oxidation (and in the oxidation of the molten salt complex discussed hereinafter) is tonnage (95+% pure) oxygen, although even purer oxygen or less pure oxygen (such as air) can be used if cost or such extra dilution can be tolerated.

The proportion of oxygen used to oxidize such ferric chloride in a ferric chloride oxidation zone generally is at least stoichiometric for the above reaction, and it often reaches as much as 10% in excess of such stoichiometric proportion. However, use of less than a stoichiometric proportion of molecular oxygen down to as little as about 90% of that needed to form ferric oxide with the quantity of ferric chloride being fed in the feed stream can be used also with good effect in my process as this tends to diminish the amount of free oxygen coming out in the chlorine product. The temperature for such ferric chloride oxidation generally will be between 650° and 900°, and preferably between about 700° and 800° to get a good rate of reaction with a reasonable degree of completion in a modest size reaction vessel. Preferable pressure in the operation will be approximately atmospheric, although total pressure of about ½ atmosphere on up to about 3 atmospheres can be used successfully. Using quite pure oxygen and feed essentially all of vapor and gas at one atmosphere total pressure, the average residence time advantageously is between about 3 and about 30 seconds (calculated on the basis that all of the oxygen fed is 100% pure, with 80 mol% of each mol of oxygen being converted immediately into 2 mols of chlorine gas while 20 mol% of it and 20 mol% of the ferric chloride fed to the zone remains as molecular oxygen and vaporized ferric chloride, respectively, such chlorine, oxygen and unreacted ferric chloride being at the operating temperature and one atmosphere total pressure, all solids including byproduct solids being ignored, and plug, i.e., piston, flow of the chlorine, unreacted oxygen, and remaining unreacted ferric chloride takes place through the otherwise empty reaction zone.)

U.S. Pat. No. 3,683,590 sheds further light on the liquid complex of ferric chloride and sodium chloride and shows how it can be used in the treatment of iron chlorides. Whether the "complex" of sodium chloride and ferric chloride is a eutectic mixture, or richer in one or the other of the ingredients from which it is made, or is an actual compound diluted with one or the other of its forming ingredients or undiluted with same is of no real significance in this improvement so long as it is liquid at a temperature no higher than about 300°. At its lowest melting point such complex approximates the empirical formula $NaFeCl_4$, and it can vary as much as 48 to 65 mol percent $FeCl_3$ and 35 to 52 mol percent $NaCl$ while still being molten or liquid above 250°.

Temperature for such oxidation of the complex with molecular oxygen is between 400° and 750°, and preferably is between 550° and 650°. Total pressure for such reaction generally can be between 0.5 and 7 atmospheres, and preferably is at about 1 atmosphere for efficiency and economy. Average residence time for oxidation of the complex can be between about 0.05 and about 15 seconds (based as indicated in Example 5, below,) and preferably is between about 1 and about 10 seconds for efficiency and economy. While a single reaction zone is preferred for converting such complex into chlorine gas and solid iron oxide and sodium chloride byproducts, such zone can embrace a plurality of interconnected reaction zones for such oxidation. While the complex can be fed to its oxidation zone as a solid, e.g., a powder, it is obviously advantageous to handle it as a liquid at all times, and this is preferred.

A simple and advantageous way of generating the complex of sodium chloride and ferric chloride is shown in U.S. Bureau of Mines, R. I. 5428 of 1958. It is to feed the crude vapor stream comprising chlorine gas and unreacted ferric chloride vapor from the ferric chloride oxidation zone into contact with coarse solid sodium chloride crystals or pellets maintained in a static bed disposed to drain. The contacting temperature advantageously is at about 200° to 800° and preferably at about 250° to 350°. The molten or liquid complex forms and drains downwardly and usually counter or cross to gases and vapors ascending the bed at a velocity low enough not to impede the flow of liquid complex significantly or entrain the liquid complex in the vapors leaving such bed. Total pressure when generating the complex preferably is about atmospheric, but can be between about 0.5 and 3 atmospheres.

Referring again to the drawing, in design case I the molecular oxygen fed into inlet 13 is in stoichiometric proportion for forming $Fe_2O_3$ with the ferric chloride in the feed vapor that enters zone 15 from lines 11 and 24, and no catalyst is used in oxidation zone 15. Feed vapor containing ferric chloride vapor (suitably from the selective chlorination of titaniferous material such as ilmenite ore containing also minute typical ilmenite-chlorination impurities such as $MnCl_2$, $MgCl_2$, and $TiCl_4$) is passed through lines 11 and 24 into ferric chloride oxidation zone 15 housed in reactor 12. Zone 15 is an open zone at about 750°. At the same time molecular oxygen ("tonnage" oxygen, about 95+% by volume) is fed into zone 15 through line 13 at the aforesaid stoichiometric rate.

Solid iron oxide byproduct forms and drops into the bottom of the zone where it is removed continuously through outlet 14 by conventional means not shown. Also generated in the zone is chlorine gas mixed with unreacted ferric chloride in vapor state. This gas and vapor are withdrawn from zone 15 as a crude vapor stream by means of outlet line 16. Said crude vapor stream will contain some unreacted oxygen and other various impurities such as unreacted metal chloride vapors, nitrogen, $CO_2$, etc. To inhibit further oxidation of the ferric chloride from taking place at the very top of reaction zone 15, outlet 16, and zone 18, it is desirable to inject a small stream of cool (e.g., 20°) chlorine liquid or gas at the very top of reaction zone 15 by an inlet not shown whereby said chlorine cools and otherwise suppresses such reaction, thereby assisting to prevent plugging of lines, spaces and interstices. Such injected chlorine becomes part of the chlorine product 1.

The crude vapor stream passes through line 16 into complexing zone 18 housed in reactor 17. Complexing zone 18 is a fixed bed of extremely coarse solid sodium chloride crystals and/or pellets, e.g., rock salt, supported by a foraminous support that permits vapor upflow and downward drainage of the resulting liquid sodium chloride salt complex into the bottom of reactor 17. Makeup sodium chloride (coarse pellets or crystals) are fed into reactor 17 by inlet 19 as is necessary. In complexing zone 18 the ferric chloride and sodium chloride combine at temperature of about 300° to provide a liquid molten salt complex approximating the proportions of $NaFeCl_4$, which may contain, in addition, a dissolved excess of either sodium chloride or ferric chloride; this complex will have a minimum melting point of about 159°, but this can be higher by many degrees and still remain liquid under the conditions of operation. Chlorine product I is withdrawn from the top of reactor 17 by outlet 21. This product is rich in chlorine gas, and it contains also $CO_2$, unreacted metal chloride vapors, and oxygen; it can be used for total chlorination of ilmenite, particularly when purified conventionally to remove condensible metal chloride vapors.

Molten salt complex drains from reactor 17 through outlet 22 and is passed through line 26, then sprayed as a fine spray by means not shown into salt complex oxidizing zone 30, housed in reactor 29. Alternatively, the molten salt complex can be fed as a fine solid to zone 30, e.g., by solidifying the complex and grinding it. A stream of tonnage oxygen enters zone 30 through line 27 for intimate mixing with said atomized complex. In this operation the oxygen fed is at least stoichiometric for converting all of the ferric chloride equivalent in the salt complex into ferric oxide, and often is slightly in excess of the stoichiometric.

In zone 30 salt complex is oxidized at 600° to yield solid iron oxide and sodium chloride byproduct (byproduct II), and this is withdrawn continuously from reactor 29 by means of outlet 28 while the chlorine product II (preponderantly chlorine gas) is withdrawn through outlet 31. Salt complex oxidizing zone 30 preferably is also an open zone housed by reactor 29, but can be, if desired, loaded with particulate inert material and operated as shown in the U.S. Pat. No. 3,376,112.

In design case II the molecular oxygen fed into inlet 13 is 10% above the stoichiometric proportion for forming $Fe_2O_3$ with the ferric chloride in the fed vapor entering zone 15 from lines 11 and 24. Other than this the operation is essentially like that of case I, except that slightly more oxygen appears in chlorine product I.

In design case III the molecular oxygen fed into inlet 13 is about 5% deficient of the stoichiometric proportion for forming $Fe_2O_3$ with the ferric chloride in the feed vapor entering zone 15 from lines 11 and 24. Otherwise the operation is essentially like that of case I, except that there is less oxygen in chlorine product I and a greater proportion of ferric chloride in the crude vapor stream leaving reaction zone 15 by means of outlet 16.

In design case IV the molecular oxygen fed into inlet 13 is in stoichiometric proportion for forming $Fe_2O_3$ with the ferric chloride in the feed vapor entering zone 15 from lines 11 and 24, and about 5 to 10% of small granular sodium chloride (basis rate of ferric chloride being fed to zone 15) is injected continuously into zone 15 from the top thereof by means not shown to catalyze the ferric chloride oxidation. Byproduct I in this case then will contain a substantial proportion of sodium chloride, as distinguished from the byproduct I which is removed from reaction zone 15 in case I. Sodium chloride in catalytic proportion (e.g., 5-10% by weight of the ferric chloride) can also be injected into line 24 for continuous feed to the reaction zone 15.

A preferred catalyzing of the reaction in zone 15 is done by passing a small proportion of molten salt complex from line 22 through lines 23 and 24 for injection into zone 15 (in such instance using about 0.2 to 10% of the salt complex per unit weight of ferric chloride entering zone 15 through line 11). The rest of the operation of case IV is essentially like that of case I.

In design case V the operation is performed with an oxygen proportion in zone 15 like that in case III, and the reaction in zone 15 is catalyzed with molten salt complex added as described in connection with case IV. In case VI, a preferred method of operation, zone 15 is catalyzed like it was in case IV, but an excess of oxygen is used like in case II. It should be understood that any sodium chloride or salt complex being fed into zone 15 as a catalyst will tend to give sodium chloride with byproduct I.

Furthermore, in any of the foregoing operations on a reasonably large scale (reactor diameters of 6 feet or larger) it is unlikely that any of the reaction zones, particularly when adequately insulated, will need much if any additional heat supply to sustain the reaction at the desired temperature or within a narrow desired temperature range once their reactions are on stream. On such scale that salt complexing step desirably is indirectly cooled. However, with substantially smaller reactors, or substantial heat leak, or in the start-up periods, or when feeding particulate solid ferric chloride or salt complex to an oxidizer to melt it or vaporize it for oxidation, it sometimes is necessary or desirable to supply heat to one or more of the reactors and lines (even though at a later stage of the operation of the same reactor some cooling can be necessary to maintain desired temperature because of the generally exothermic nature of the various reactions (and complexing) involved. Hence it is certainly feasible to add to reaction zones 15 and 30, a fuel such as carbon monoxide, carbon, phosgene, or the like which burns during the process in such zone with oxygen being fed thereto. Alternatively, the reactors 12 and 29 can be indirectly heated and the feeds thereto and withdrawals therefrom heated and cooled in conventional manner. Reactor 17 also can be indirectly cooled and heated in conventional manner with internal elements in the bed and/or an exterior jacket. Gases such as hot products of combustion of CO can be admitted directly into said complexing zone, but this is less desirable because of the product dilution which then occurs. When the walls of reactors 12 and 29 are heated from the exterior little if any solids build-up on them is likely to occur. The processing advantageously is kept substantially anhydrous in all steps illustrated for obvious reasons.

The following examples show ways in which this improvement can be operated, but should not be construed as limiting the invention. All percentages herein are weight percentages, all parts are parts by weight, and all temperatures are in degrees centigrade, unless otherwise expressly noted.

EXAMPLE 1

A laboratory selective chlorination of Australian ilmenite ore (54% $TiO_2$, 30% total Fe) was maintained in an essentially atmospheric pressure vertical cylindrical quartz fluid bed chlorinator 74mm O.D. by 38 inches tall. The chlorinator was externally heated by electrical heating to maintain temperature of 1000° in the bed. Chlorine gas at the rate of 750 grams per hour was admitted through a porous quartz disc 7½ inches above the bottom. Gas and vapor (containing a trace of carbon solids) were withdrawn from a duct 8½ inches below the top, said duct being externally heated by electricity. The initial bed was 1,600 grams of previously selectively chlorinated ilmenite (containing 92% $TiO_2$ and passing 40 mesh and retained on a 200 mesh U.S. Std. Sieve) mixed with 250 grams of petroleum coke particles that would be retained on a 40 mesh U.S. Std. Sieve. The bed fluidized to a height of 16 inches above the porous disc, and solids output was drawn off by a downwardly sloped outlet at this level, which outlet was purged free of chlorination product gases with a small flow of nitrogen.

Fresh ilmenite ore (particles size about the same as the initial bed particles) and fresh +40 mesh petroleum coke were fed as a mixture through a quartz tube entering the top of the chlorinator and discharging therein at a point 5 cm. above the porous disc. This inlet tube was purged with 3.2 SCFH (measured at 70°F. and 1 atmosphere total pressure) of nitrogen gas to preclude entry of chlorination product gases. Fresh ore feed was 1,300 grams per hour and fresh coke feed was 180 grams per hour. About 1,100 grams per hour of ferric chloride vapor was removed from said duct along with nitrogen and carbon oxides. Carbon oxides were analyzed by gas chromatograph and ran 0-4 mol percent CO and 96-100 mol percent $CO_2$. From 97% to 100% of the chlorine gas introduced to the chlorinator was reacted.

EXAMPLE 2

The gas and vapor products from said chlorinator duct described in Example 1 were passed substantially horizontally and tangentially into the top of a cylindrical unpacked oxidizer made of quartz. It was 5 inches O.D. and 12 inches high, had a vertical oxygen and salt inlet centrally at its top, and a substantially horizontal and tangential outlet for reaction products at its bottom. The oxidizer was maintained at 780°-840° by means of external electrical heaters. Oxygen gas (99.6 volume % pure) was fed into the top at 5.4 SCFH, which is 20% in excess for the reaction $4FeCl_3+3O_2=2Fe_2O_3+6Cl_2$, together with granular (finer than 60 mesh U.S. Std) sodium chloride catalyst at 50-70 grams per hour.

The hot gases leaving the oxidizer at about 800° were cooled by passage into an uninsulated cyclone separator to remove finely-divided ferric oxide byproduct, and the unreacted ferric chloride condensed to provide a chlorine-rich output gas stream. Conversion of the $FeCl_3$ fed was found to be 85%. Under identical conditions, except that no sodium chloride was added, conversion of the $FeCl_3$ fed was found to be 70%.

EXAMPLE 3

The hot gas discharged from the duct of the selective chlorinator of Example 1 was cooled by passage through an uninsulated cyclone separator operating at about 150°. Metal chlorides preponderating in $FeCl_3$ condensed as a dry powder of the following composition:

95.2% $FeCl_3$
0.9% $FeCl_2$
2.4% $MnCl_2$
0.8% ore blow-over, and this powder was withdrawn from the cyclone. The gas which discharged from the cyclone was a mixture of essentially $CO_2$, $N_2$ and a small amount of unreacted chlorine.

The $FeCl_3$ powder was fed by a hopper and vibratory feeder through a jacketed, water cooled tube to near the bottom of a vertical cylindrical quartz tube oxidizer that was electrically heated to maintain the oxidation zone therein at 800°. Oxygen (99.6% purity) was fed to the oxidizer from the bottom through a porous quartz plate. The hot gases from oxidation discharged from near the top of the oxidizer and were cooled by passage through an uninsulated cyclone separator. Unreacted $FeCl_3$ condensed and was discharged along with finely divided $Fe_2O_3$ and NaCl.

Solids fed to the $FeCl_3$ oxidizer were: 100 parts $FeCl_3$; 5 parts of −20+60 mesh NaCl; and 2.55 parts of coke dust (−325 mesh). This mixture was fed at 402 grams per hour along with 0.54 SCFH of oxygen and 0.20 SCFH of $N_2$ through said water-cooled oxidizer feed tube. Oxygen fed through the porous quartz plate was at 2.03 SCFH. The gas from the overhead of the cyclone separator were sampled periodically, and it was found that 90% of the $FeCl_3$ reacted to liberate chlorine.

When this experiment was repeated without using NaCl, 75% of the $FeCl_3$ was found to so react. As a substantial amount of $Fe_2O_3$ (solids) were found to collect at the bottom of the oxidizer, it was then redesigned to have a frustroconical bottom outlet, small end down, for these solids, with oxygen to be fed into the conical section and $FeCl_3$, NaCl, and coke dust to be fed slightly above such section.

EXAMPLE 4

Hot gases leaving the oxidizer of Example 2 can be passed into an inlet near the base of a vertical salt complexing reactor like that illustrated on page 3 of the U.S. Bureau of Mines Report of Investigations 5428 (1958) − Library of Congress catalogue No. (TN23. U43 No. 5428 *669.732 58−62264). Herein the $FeCl_3$ at about atmospheric pressure complexes with rock salt; vapors drawn off the top are the uncomplexed gases and vapors, while virtually all of the $FeCl_3$ is drawn off the base as a molten $NaCl-FeCl_3$ "complex." The complexing reaction zone is maintained at 200°-250° by indirect heat exchange applied to the reactor and to the gases being fed thereto. To arrest the oxidation of $FeCl_3$ in the hot gases fed from the oxidizer in Example 2 a small flow of liquid chlorine can be sprayed therein near the product outlet to cool the withdrawn flow and otherwise arrest oxidation of the $FeCl_3$ but keep it above about 320° where it does not liquify or solidify, but can convert at least in part to the dimer ($Fe_2Cl_6$) form. (Where ferric chloride is referred to herein as $FeCl_3$, it should be interpreted as an empirical rather than a molecular formula).

EXAMPLE 5

Molten $NaCl-FeCl_3$ complex drawn off the base of the complexing reactor of Example 4 can be passed through an electrically heated line and into an atomizing nozzle that discharges into a quartz complex oxidizer, an unpacked vessel constructed like the one with the conical bottom described in Example 3. Atomization can be assisted by use of a small flow of nitrogen in the nozzle. The liquid complex enters near the base of the oxidizing zone slightly above a flow of virtually pure oxygen that mixes intimately with it. This salt complex oxidizing zone is maintained at about 1 atmosphere total pressure and 500°, utilizing in part the exothermic heat of reaction and the liquid feed electrical preheating with provision for indirect heat exchange around the oxidizer walls. At this temperature the vapor pressure of $NaFeCl_4$ over liquid $NaFeCl_4$ is only about 1mm. Hg and the vapor pressure of $Fe_2Cl_6$ over liquid $NaFeCl_4$ is only about 10mm. Hg. The reaction with oxygen is thought to be mainly with the liquid $NaCl$-$FeCl_3$ complex and can be represented as follows: $4NaFeCl_4(1)+3O_2(g)=2Fe_2O_3(s)+4NaCl(s)+6Cl_2(g)$, and the oxygen feed to this reactor is essentially stoichiometric for this reaction.

At the bottom of this salt complex oxidation reactor particles of mainly $Fe_2O_3$ and $NaCl$ are discharged through a rotary valve. The product gas, consisting mainly of $Cl_2$ with a small amount of unreacted oxygen, is cooled directly to about 200° with a spray of liquid chlorine, then passed through a dust collector to remove iron oxide fines and unreacted, condensed $FeCl_3$ particles. Average residence time in this oxidation zone will be about 6–10 seconds and the conversion of $FeCl_3$ to $Fe_2O_3$ and $Cl_2$ about 92%. Said residence time is computed on the basis that the oxygen fed is 100% pure, with 92 mol% of each mol of oxygen being converted immediately into 2 mols of chlorine gas while 8 mol% of it remains as molecular oxygen gas these gases at 500° and 1 atmosphere total pressure, all volumes of ferric chloride vapor including unreacted ferric chloride vapor remaining, and the feed and the byproduct solids are ignored, and plug (i.e., piston) flow of the chlorine and unreacted oxygen takes place through the otherwise empty reaction zone.

A small flow of the liquid salt complex, amounting to a few tenths of a percent of the $FeCl_3$ being fed to the ferric chloride (primary) oxidation zone of Example 2, can be diverted from the salt complex feed to the salt complex oxidation reactor and fed into said primary oxidation zone as a catalyst in lieu of or in augmentation of the NaCl feed thereto. Advantageously this salt complex catalyst feed is sprayed into or near the inlet of the ferric chloride feed inlet to the ferric chloride oxidizing zone.

Additionally, the product gas from line 31 can be cooled to just above the precipitation point of ferric chloride therein, then passed into contact with sodium chloride to remove $FeCl_3$ therefrom as salt complex. When this operation is done in a separate complexing zone apart from zone 18, a very high grade of chlorine gas results. This product gas, of course, also can be returned to salt complexing zone 18 for removal of its ferric chloride content, then producing a chloride product I further enriched in chlorine and the other vapors and gases passing through line 31.

I claim:

1. In a process for recovering chlorine from feed bearing ferric chloride by oxidation of said ferric chloride with molecular oxygen in a ferric chloride oxidation zone, under ferric chloride oxidizing conditions, wherefrom iron oxide is withdrawn as a solid byproduct while chlorine gas and unreacted ferric chloride vapor is withdrawn as a crude vapor stream, the improvement which comprises:
   contacting said crude vapor stream with sodium chloride in a complexing zone under conditions for converting unreacted ferric chloride vapor therein into liquid sodium ferric chloride salt complex;
   withdrawing from said complexing zone a vapor stream containing chlorine gas as a first recovery product;
   withdrawing said liquid salt complex from said complexing zone;
   contacting withdrawn salt complex with additional oxygen in a salt complex oxidizing zone under conditions for converting said salt complex into additional chlorine gas, additional solid iron oxide and sodium chloride byproducts;
   withdrawing said byproducts from said salt complex oxidizing zone; and
   withdrawing said additional chlorine gas from said salt complex oxidizing zone as a second recovery product.

2. The process of claim 1 wherein a catalytic amount of sodium ferric chloride salt complex-providing material is fed to said ferric chloride oxidation zone.

3. The process of claim 2 wherein said sodium ferric chloride complex-providing material is sodium ferric chloride complex from said complexing zone.

4. The process of claim 1 wherein said molecular oxygen fed to said ferric chloride oxidation zone is at least stoichiometric to form ferric oxide with the ferric chloride in said feed vapor.

5. The process of claim 1 wherein said crude vapor stream is treated for substantially completely arresting further oxidation of ferric chloride therein, but is maintained sufficiently warm for keeping said ferric chloride therein in the vapor state.

6. The process of claim 1 wherein said feed is obtained by the selective chlorination of titaniferous material.

7. The process of claim 6 wherein said titaniferous material comprises an ilmenite ore.

* * * * *